United States Patent
Domeyer et al.

(10) Patent No.: US 9,776,631 B1
(45) Date of Patent: Oct. 3, 2017

(54) FRONT VEHICLE STOPPING INDICATOR

(71) Applicant: TOYOTA MOTOR ENGINEERING & MANUFACTURING NORTH AMERICA, INC., Erlanger, KY (US)

(72) Inventors: Joshua E. Domeyer, Ann Arbor, MI (US); Heishiro Toyoda, Ann Arbor, MI (US)

(73) Assignee: TOYOTA MOTOR ENGINEERING & MANUFACTURIG NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/139,392

(22) Filed: Apr. 27, 2016

(51) Int. Cl.
| | |
|---|---|
| *B60W 30/09* | (2012.01) |
| *B60W 10/18* | (2012.01) |
| *B60W 10/20* | (2006.01) |
| *B60Q 1/46* | (2006.01) |

(52) U.S. Cl.
CPC .............. *B60W 30/09* (2013.01); *B60Q 1/46* (2013.01); *B60W 10/18* (2013.01); *B60W 10/20* (2013.01)

(58) Field of Classification Search
CPC ...... B60W 30/09; B60W 10/18; B60W 10/20; B60C 1/46
USPC .......................................................... 701/41
See application file for complete search history.

(56) References Cited

U.S. PATENT DOCUMENTS

| | | | |
|---|---|---|---|
| 7,319,932 B2 | 1/2008 | Thorne | |
| 7,774,137 B2 | 8/2010 | Thorne | |
| 8,744,661 B2 | 6/2014 | Horn | |
| 9,050,977 B1 | 6/2015 | Dolgov et al. | |
| 2004/0083035 A1* | 4/2004 | Ellis | A61H 3/061 701/1 |
| 2004/0145496 A1* | 7/2004 | Ellis | A61H 3/061 340/905 |
| 2006/0244632 A1* | 11/2006 | Corcoran | B60Q 1/44 340/902 |
| 2009/0256698 A1 | 10/2009 | Bonilla | |
| 2010/0106356 A1* | 4/2010 | Trepagnier | G01S 17/023 701/25 |
| 2013/0057397 A1 | 3/2013 | Cutler et al. | |
| 2013/0151058 A1 | 6/2013 | Zagorski et al. | |
| 2015/0019116 A1 | 1/2015 | Koshizen | |

* cited by examiner

*Primary Examiner* — Jelani Smith
*Assistant Examiner* — James E Stroud
(74) *Attorney, Agent, or Firm* — Oblon, McClelland, Maier & Neustadt, L.L.P.

(57) ABSTRACT

A system for signaling road hazards and emergency actions to nearby road users comprising a vehicle, the vehicle having at least three wheels, a vehicle control circuitry, one or more sensors, and a vehicle system controller. The vehicle control circuitry monitors data from the one or more sensors, detects hazardous situations, and controls the vehicle system controller to control the vehicle, induce a dynamic vehicle behavior, and visually signal the vehicle is performing an emergency maneuver.

16 Claims, 7 Drawing Sheets

FRONT VEHICLE STOPPING INDICATOR

BACKGROUND

Field of the Disclosure

The present disclosure is directed toward a system and method for signaling road hazards and emergency actions to nearby vehicles through vehicle dynamic behavior.

Description of the Related Art

Vehicle collisions may occur in a variety of ways including, for example, from driver inattentiveness, lack of awareness, loss of control, or fatigue. The introduction of autonomous and semi-autonomous vehicle systems have helped to reduce the likelihood of collisions under certain circumstances by automating all or some driving functions, or allowing a vehicle system to intervene in cases where a collision is imminent.

However, other vehicles in the vicinity of a vehicle encountering or experiencing an emergency, particularly those vehicles operated fully or in part by human drivers, may not be prepared to adequately respond to the actions of a vehicle equipped with autonomous or semi-autonomous driving functions. For these reasons it is important that improved systems and methods for detection and avoidance of vehicle collisions continue to be developed with the aim of reducing the frequency and severity of such incidents.

SUMMARY

The present disclosure is directed toward a system for signaling road hazards and emergency actions to nearby road users including pedestrians, bicyclists, and other vehicles, comprising a vehicle, the vehicle having at least three wheels, a vehicle control circuitry, one or more sensors, and a vehicle system controller. The vehicle control circuitry monitors data from the one or more sensors, detects hazardous situations, and controls the vehicle system controller to control the vehicle, induce a dynamic vehicle behavior, and visually signal the vehicle is performing an emergency maneuver.

Further disclosed is a method for alerting nearby road users of road hazards and emergency maneuvers, the method comprising the steps of detecting potential road hazards and emergencies, calculating collision avoidance alternatives, maneuvering a vehicle to perform at least one of a braking and swerving action, and signaling the presence of an emergency through vehicle dynamic behavior.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
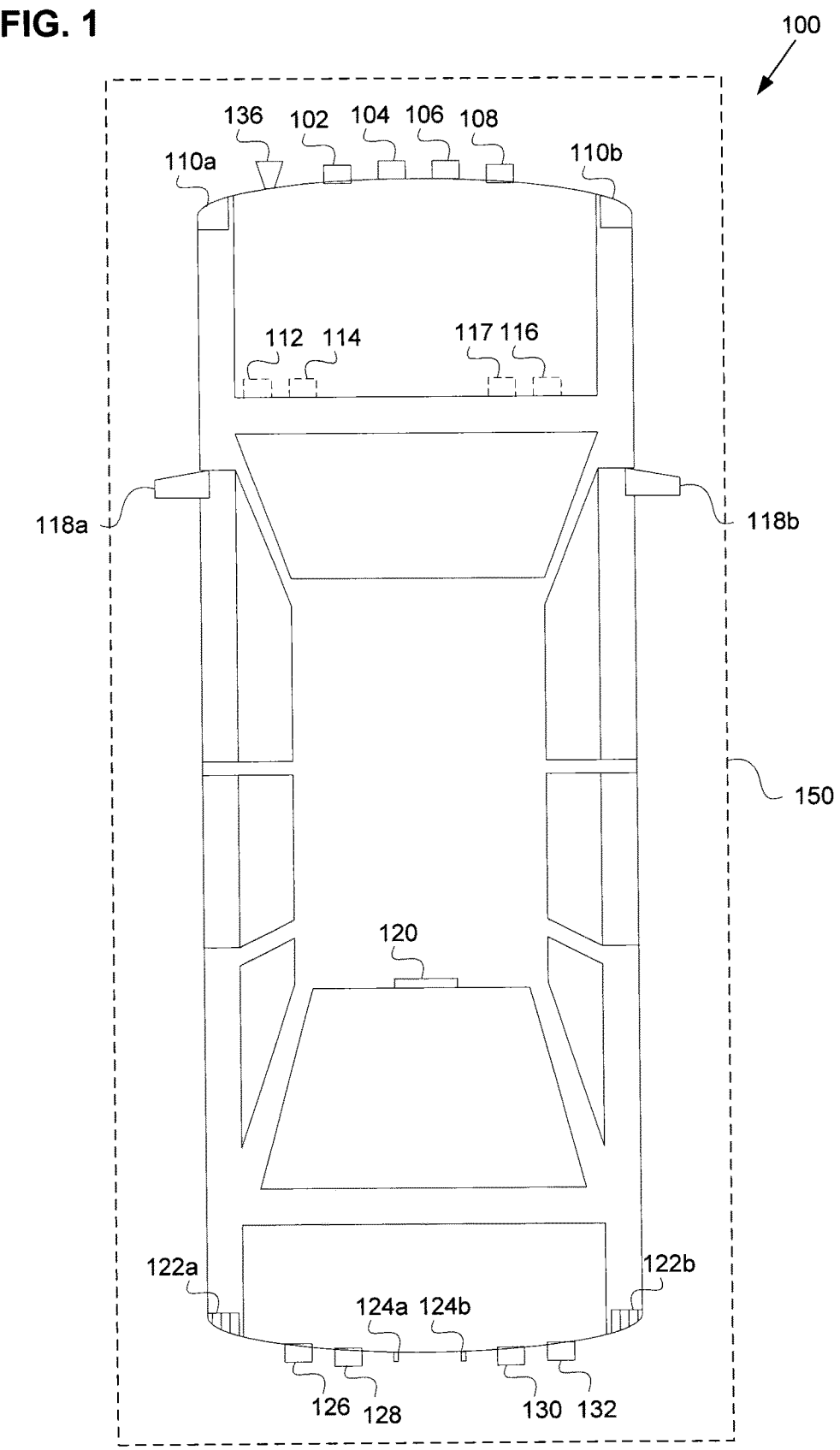
FIG. 1 is a plan view of a vehicle equipped with sensors for monitoring a driving environment, according to one example.

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

FIG. 1 is a plan view of a vehicle 100 equipped with sensors for monitoring a driving environment, according to one example. The vehicle 100 includes vehicle control circuitry 150, a head lamp unit 110a, a head lamp unit 110b, a Center High Mounted Stop Lamp (CHMSL) 120, a tail lamp unit 122a, a tail lamp unit 122b, a license plate lamp 124a, a license plate lamp 124b, a communication unit 116, a location unit 117, at least one of a radar unit 102, an infrared unit 104, a camera unit 106, a lidar unit 108 for monitoring a first end (front) of the vehicle 100, a blindspot monitor 118a and a blindspot monitor 118b for monitoring sides of the vehicle 100, and a horn 136. The vehicle 100 may further include one or more vehicle system controllers for controlling vehicle dynamic behavior. Examples include a brake controller 112 and a steering controller 114. The CHMSL 120 may comprise multiple, independently controlled lighting elements.

The vehicle 100 may further include one or more of a radar unit 126, an infrared unit 128, a camera unit 130, and a lidar unit 132 for monitoring at a second end (rear) of the vehicle 100. The vehicle 100 is so equipped for the purpose of monitoring the driving environment and responding to hazardous or potentially hazardous situations to enhance safety for occupants and others within close proximity of the vehicle 100. The Society of Automotive Engineers (SAE) provides a framework for classifying various degrees of automation present within an automobile, defined as a spectrum spanning from Level Zero (no automation) through to Level 5 (full automation). The features and systems disclosed herein are generally applicable to a vehicle 100 with a level of automation corresponding to Level Two or higher.

The vehicle control circuitry 150 may comprise a data bus such as a control area network (CAN) and one or more electronic modules distributed about the vehicle 100, for example an engine control unit (ECU), transmission control unit (TCU), anti-lock brake system (ABS), body control modules (BCM), and various sensors, as well as related software for sensing, detecting, and controlling certain vehicle operations. Further, the vehicle control circuitry 150 may be connected to additional communication systems or configured to communicate with other devices or networks that may be internal to or external of the vehicle 100, and to send and/or receive data pertaining to the vehicle 100 or an operating environment.

Using available sensors, the vehicle control circuitry 150 may monitor and actively control certain driving functions during vehicle operation in an automated mode, partially automated mode, or through intervention while the vehicle 100 is operated in a driving mode involving some control by a human operator, as the vehicle 100 detects potentially hazardous scenarios based on sensor input and analysis of data collected.

Each radar unit 102 and radar unit 126 monitors activity near or facing the first and the second end of the vehicle 100, respectively, using radar technology to detect the driving environment, for example by using radio waves to detect other vehicles and objects in the vicinity of the vehicle 100.

Each infrared unit 104 and infrared unit 128 monitors activity near or facing the first and the second end of the vehicle 100, respectively, using infrared technology to detect the driving environment, for example by creating an image of surrounding terrain based on heat signatures of surrounding objects detected.

Each camera unit 106 and camera unit 130 monitors activity near or facing the first and the second end of the vehicle 100, respectively, using camera and visual technology to detect the driving environment, for example by using digital cameras and computer vision software to recognize obstacles in the road.

Each lidar unit 108 and lidar unit 132 monitors activity near or facing the first and the second end of the vehicle 100, respectively, using LIDAR technology to detect the driving environment, for example by creating a 3D map from the reflected light signals received as a result of emitting light.

Each blindspot monitor 118a and blindspot monitor 118b monitors for obstacles and objects directly to a left and right side of a vehicle 100, respectively, generally using radar, ultrasound, or camera-based technology to detect the driving environment by monitoring for objects and other vehicles adjacent to a side of the vehicle 100.

The location unit 117 may comprise at least one of a number of elements, such as GPS and cellular signal triangulation, allowing the vehicle control circuitry 150 to determine the location of the vehicle 100.

The communication unit 116 may comprise at least one of a number of elements that are individually controlled allowing for receiving and broadcasting signals related to driving conditions, for example via Dedicated Short Range Communications (DSRC), Wi-Fi, cellular networks, and radio.

Availability of additional driving environment data may aid the vehicle control circuitry 150 in determining potential hazards and threats, and improve the ability of the vehicle control circuitry 150 to respond to, for example, the risk of a collision and determining the number of available potential collision avoidance alternatives (e.g., escape routes).

The brake controller 112 may be configured to allow the vehicle control circuitry 150 to control the magnitude and timing of use of a vehicle brake disposed at each wheel.

The steering controller 114 may be configured to allow for the vehicle control circuitry 150 to control the magnitude and timing of the vehicle steering to swerve the vehicle 100 as needed and deemed appropriate by the vehicle control circuitry 150 via process S800.

Each of the head lamp unit 110a, the head lamp unit 110b, the CHMSL 120, the tail lamp unit 122a, the tail lamp unit 122b, the license plate lamp 124a, and the license plate lamp 124b, may be connected to the vehicle control circuitry 150, and may comprise one or more lighting elements that are individually controlled allowing for a variety of signaling modes that may involve emitting at least one of varying levels of intensity (e.g., brightness), color, time duration, and other effects such as rapid flashing, strobing, or other illumination sequences or patterns to signal a hazardous situation or emergency vehicle maneuver.

In one example, only the tail lamp unit 122a or only the tail lamp unit 122b may flash repeatedly. In another example, both the tail lamp unit 122a and the tail lamp unit 122b flash repeatedly simultaneously. In another example, the tail lamp unit 122a and the tail lamp unit 122b alternate flashing repeatedly such that when the tail lamp unit 122a is illuminated the tail lamp unit 122b is not illuminated, and vice versa. In another example, the tail lamp unit 122a may flash repeatedly while the tail lamp unit 122b remains illuminated, or vice versa. In another example, the tail lamp unit 122a is illuminated or flashes repeatedly, and is disposed on a side of the vehicle 100 toward which the vehicle 100 swerves. In another example, the tail lamp unit 122a is illuminated or flashes repeatedly, and is disposed on a side of the vehicle 100 away from which the vehicle 100 swerves.

The examples provided in this paragraph may also be applicable to any combination of the head lamp unit 110a, the head lamp unit 110b, the license plate lamp 124a, and the license plate lamp 124b.

The horn 136 may be operated by the vehicle control circuitry 150 to audibly signal a hazardous or emergency situation. The signal may comprise a pattern or sequence of sounds based on a tone of the horn 136 used during normal operation, or the pattern or sequence of sounds may be distinct, if such capability is available, from a tone of the horn 136 used during normal operation.

Figure 2A:
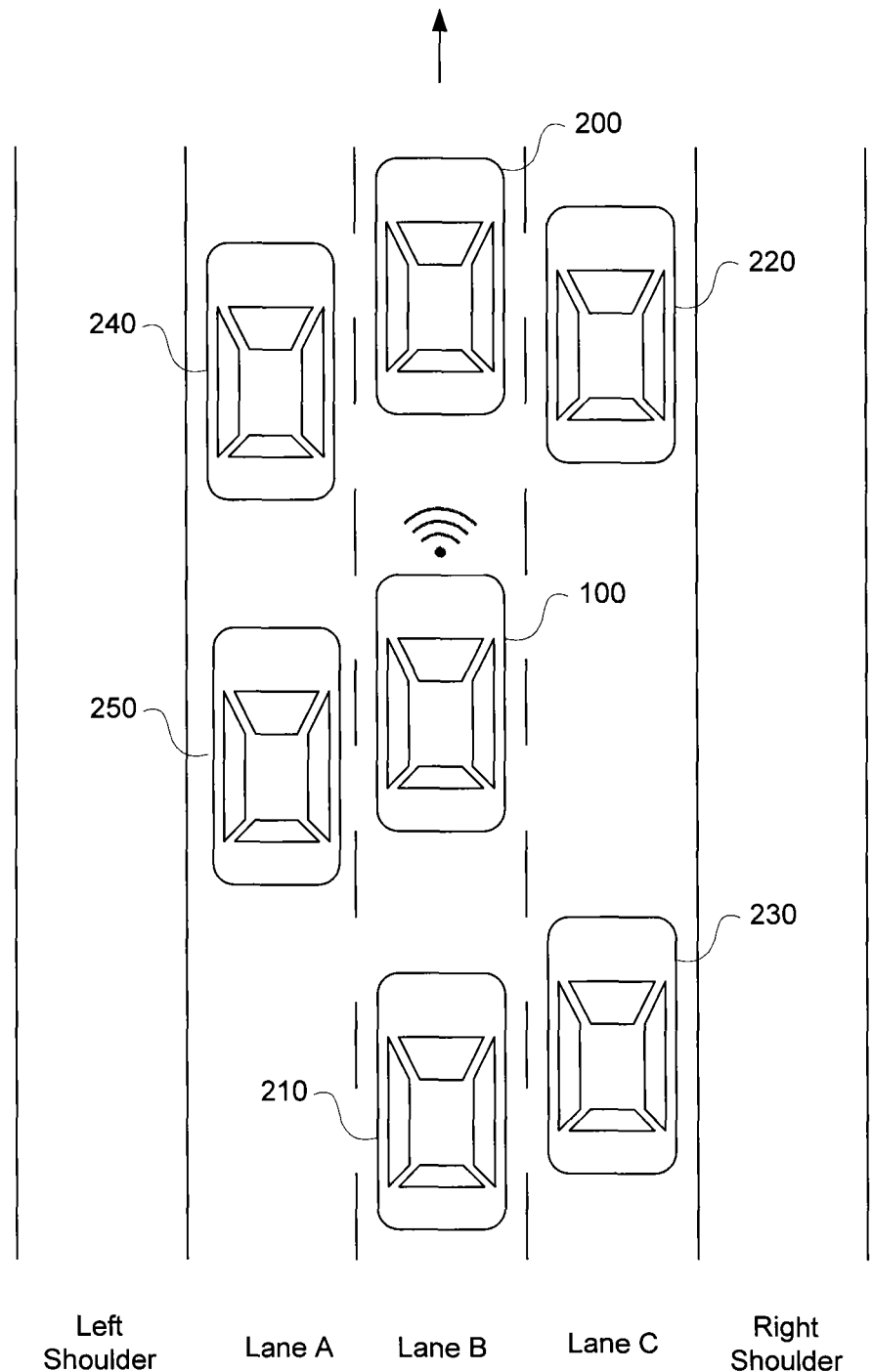
FIG. 2A is a plan view of an operating scenario of a vehicle traveling on a multi-lane road, according to one example.
Figure 2B:
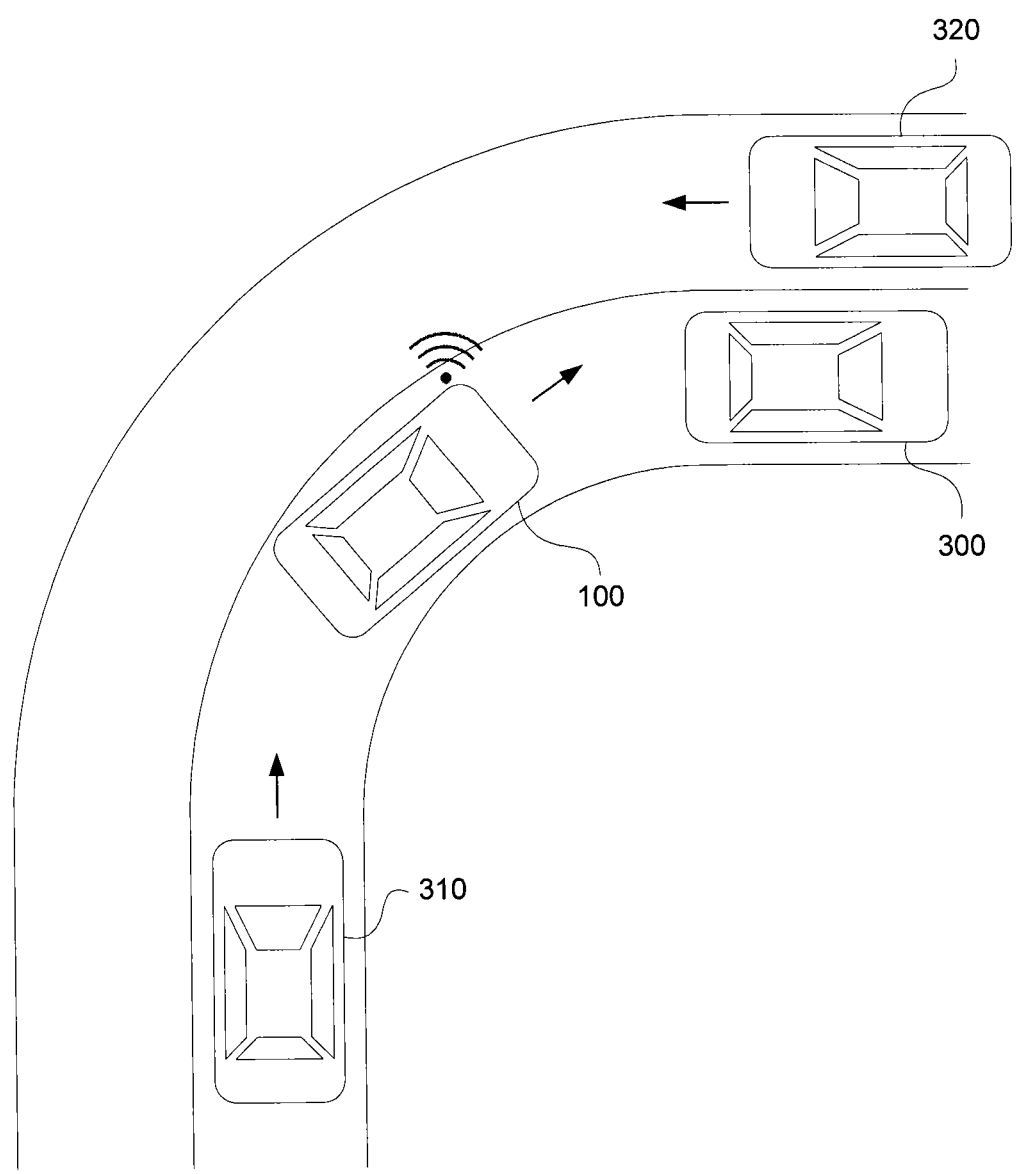
FIG. 2B is a plan view of an operating scenario of a vehicle traveling on a curved two lane road, according to one example.
Figure 2C:
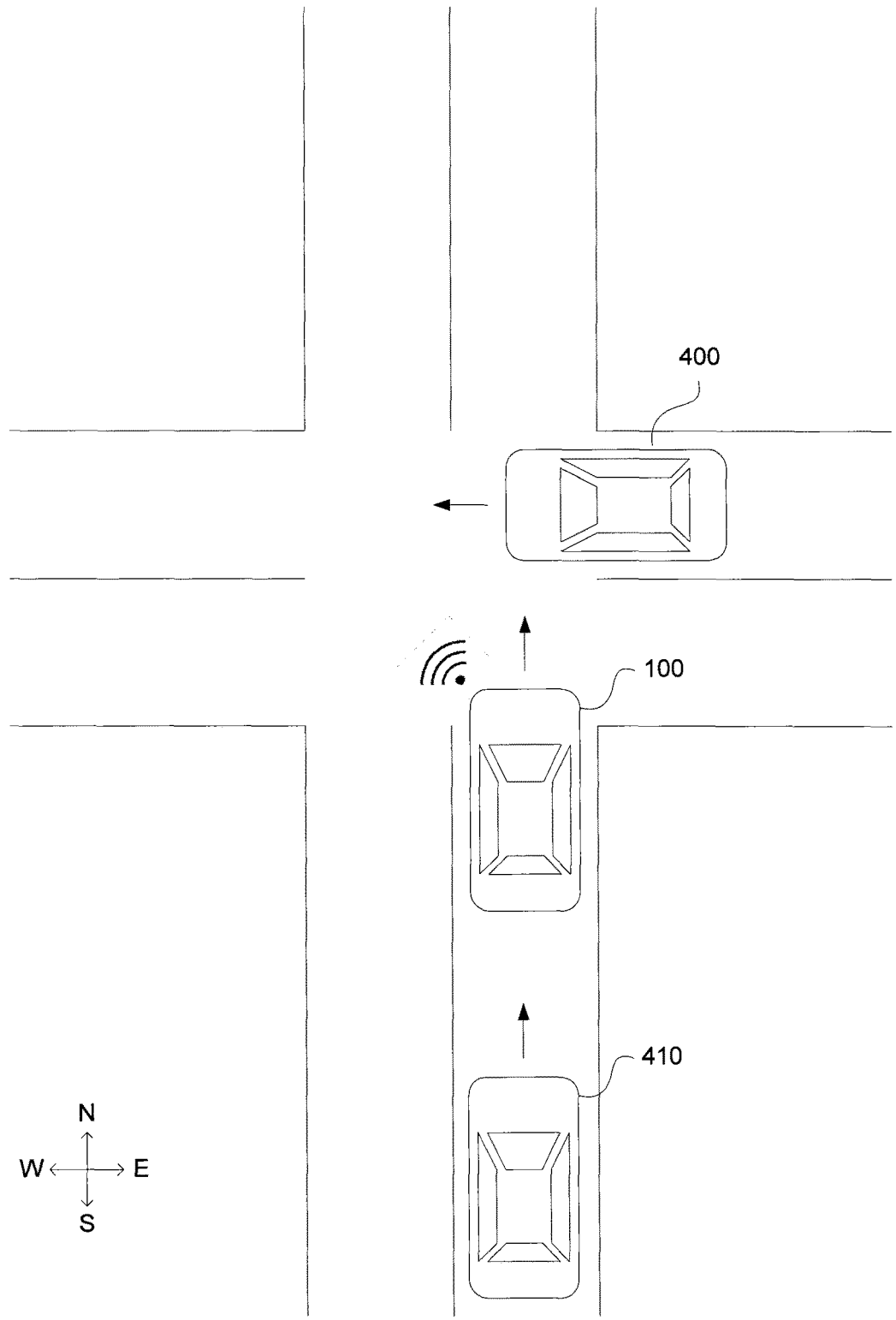
FIG. 2C is a plan view of an operating scenario of a vehicle traveling through a four-way intersection, according to one example.

FIG. 2A, FIG. 2B, and FIG. 2C highlight several potential examples of many possible scenarios in a driving environment the vehicle 100 may encounter where the vehicle control circuitry 150 is needed.

FIG. 2A is a plan view of an operating scenario of a vehicle 100 traveling on a multi-lane road, according to one example. The vehicle 100 is traveling in a forward direction on a road having three travel lanes A, B, and C, a left shoulder lane, and a right shoulder lane. Other vehicles present on the road, in close proximity, and also traveling in the same direction include a vehicle 200, a 210, a vehicle 220, a vehicle 230, a vehicle 240, and a vehicle 250. The vehicle 200 may be rapidly decelerating for a variety of reasons. In such a case the vehicle 100 is at risk of a collision with the vehicle 210 if the vehicle 100 does not quickly change its trajectory, or reduce speed to reduce the potential severity of impact.

In another example, the vehicle 200 may be an immobile object, for example a box, mattress, or ladder that has fallen onto the road, or an animal carcass.

In another example, the vehicle 200 may be another moving object, for example one or more persons, cyclists, or animals. Further, if the vehicle 200 comprises one or more persons, the potential for injury and loss of life is even greater.

In all of the above cases, the vehicle 100 is at risk of a collision with the vehicle 210 if the vehicle 100 does not quickly change its trajectory, or reduce speed to reduce the potential severity of impact. In the above cases those hazards may not be visible from the vehicle 210 due to obstacles or the driver of the vehicle 210 not being aware of the hazard.

One response to these scenarios may comprise the steps of calculating a change in vehicle speed needed to avoid a collision with the vehicle 210, determining if such a change in vehicle speed of the vehicle 100 would result in a collision with the 210, detecting the presence of another vehicle on either side of the vehicle 100, broadcasting a hazard signal to other vehicles and electronic devices in the vicinity, inducing a visual signal through vehicle behavior by braking, activating a turn signal indicator, and swerving to a side that is clear of traffic.

Another response may comprise the steps of broadcasting a hazard signal to other vehicles and electronic devices in the vicinity, calculating a change in vehicle speed needed to avoid a collision with the vehicle 210, activating the tail lamp unit 122a and the tail lamp unit 122b in a sequence and using at least one level of intensity or brightness, and activating the horn 136 to audibly warn others.

FIG. 2B is a plan view of an operating scenario of a vehicle 100 traveling on a curved two lane road, according to one example. The vehicle 100 is traveling in a forward direction around a curve on the road. A vehicle 300 is disposed ahead of the vehicle 100 in the same lane, a vehicle 320 is traveling in the opposite direction as the vehicle 100 and on an adjacent lane of the road, and a vehicle 310 is disposed behind the vehicle 100 in the same lane as the vehicle 100. The vehicle 310 is driving at a speed approximately the same as that of the vehicle 100. The vehicle 300 may be quickly slowing or already stopped in the same lane as that of the vehicle 100 and the vehicle 310. In such a case the vehicle 100 is at risk of colliding with the vehicle 300 if the vehicle 100 does not quickly change its trajectory or speed.

As in one alternate example from FIG. 2B, the vehicle 300 may be an immobile object, for example a box, mattress, or ladder that has fallen onto the road, or an animal carcass. Again, the vehicle 100 is at risk of a collision with the vehicle 310 if the vehicle 100 does not quickly change its trajectory, or reduce speed to reduce the potential severity of impact.

In another example, the vehicle 300 may be another moving object, for example one or more persons, cyclists, or animals. Further, if the vehicle 310 comprises one or more persons, the potential for injury and loss of life is even greater.

In all of the above cases, the vehicle 100 is at risk of a collision with the vehicle 310 if the vehicle 100 does not quickly change its trajectory, or reduce speed to reduce the potential severity of impact. In the above cases those hazards may not be visible from the vehicle 310 due to obstacles or the driver of the vehicle 310 not being aware of the hazard.

One response to these scenarios may comprise the steps of calculating a change in vehicle speed needed to avoid a collision with the vehicle 310, determining if such a change in vehicle speed of the vehicle 100 would result in a collision with the vehicle 310, detecting a width of a lane and where the vehicle 100 is within the lane, detecting the presence of another vehicle on either side of the vehicle 100, broadcasting a hazard signal to other vehicles and electronic devices in the vicinity, braking to slow the vehicle and to induce a visual signal through vehicle behavior, simultaneously inducing a visual signal through vehicle dynamic behavior by swerving, activating the tail lamp unit 122a, the tail lamp unit 122b, the head lamp unit 110a, and the head lamp unit 110b in a sequence and using at least one level of intensity or brightness, and activating the horn 136 to audibly warn others.

Another response may comprise the steps of broadcasting a hazard signal to other vehicles and electronic devices in the vicinity, braking to slow the vehicle and to induce a visual signal through vehicle dynamic behavior, activating the tail lamp unit 122a, the tail lamp unit 122b, the head lamp unit 110a, and the head lamp unit 110b in a sequence and using at least one level of intensity or brightness, and inducing a body roll visual signal through vehicle dynamic behavior by swerving. The sequence of steps may be repeated multiple times within one emergency maneuver or event.

FIG. 2C is a plan view of an operating scenario of a vehicle 100 traveling through a four-way intersection, according to one example. The vehicle 100 is traveling in a forward, northbound direction and is entering the intersection while a vehicle 410 is traveling behind the vehicle 100 in the same lane and direction. A vehicle 400 traveling in a forward, westbound direction has already entered the intersection ahead of the vehicle 100, for example as a result of accelerating from a stop or by not stopping prior to entering the intersection. In such a case the vehicle 100 is at risk of colliding with the vehicle 410 if the vehicle 100 does not quickly change its trajectory or speed.

In another example, the vehicle 400 may be another moving object, for example one or more persons, cyclists, or animals. Again, the vehicle 100 is at risk of a collision with the vehicle 410 if the vehicle 100 does not quickly change its trajectory, or reduce speed to reduce the potential severity of impact. Further, if the vehicle 410 comprises one or more persons, the potential for injury and loss of life is even greater. In the above cases those hazards may not be visible from the vehicle 410 due to obstacles or the driver of the vehicle 410 not being aware of the hazard.

One response to these scenarios may comprise the steps of broadcasting a hazard signal to other vehicles and electronic devices in the vicinity, activating the horn 136 to audibly warn others, and braking to slow the vehicle and to induce a visual signal through vehicle dynamic behavior.

Another response may comprise the steps of the previous paragraph and the additional steps of activating the tail lamp unit 122a, the tail lamp unit 122b, the license plate lamp 124a, the license plate lamp 124b, the head lamp unit 110a, and the head lamp unit 110b in a sequence and using at least one level of intensity or brightness, and inducing a body roll visual signal through vehicle dynamic behavior by swerving to a side of the vehicle 100, possibly inducing a yaw moment to rotate the vehicle 100 if a collision with the vehicle 410 is unavoidable so as to potentially reduce the severity of impact.

Each of the example responses comprises at least one of several types of actions by the vehicle control circuitry 150. Categories of actions may include detecting, calculating, communicating, activating, signaling, and maneuvering. For each scenario described by FIG. 2A-FIG. 2C, the example responses described are not limiting and are merely exemplary of a wide variety of combinations of possible actions that may be taken.

Figure 3A:
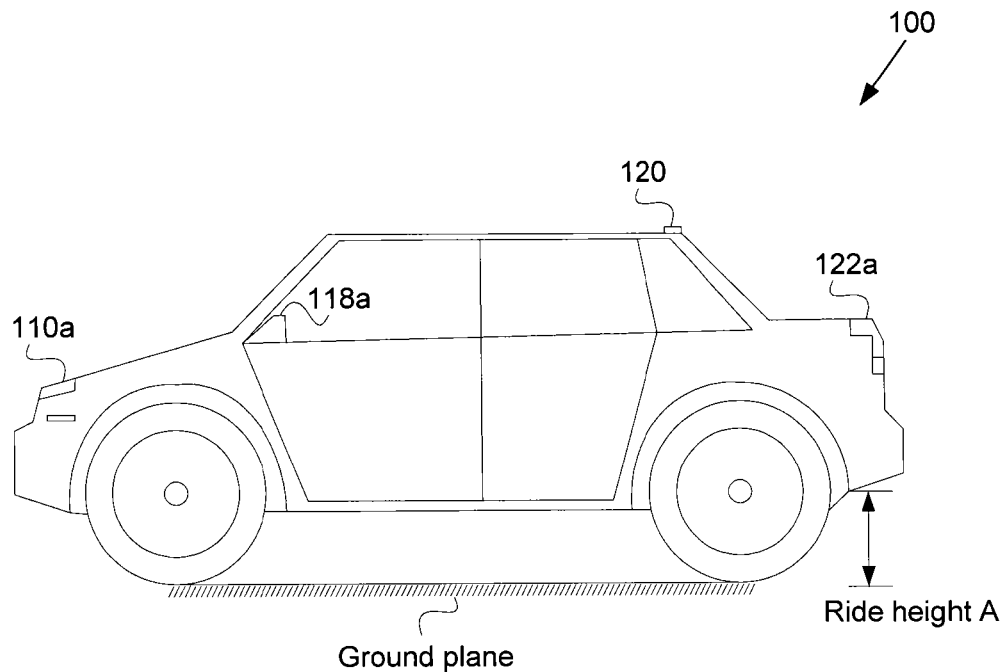
FIG. 3A is a side view of a vehicle in a static or a steady state operating condition, according to one example.

FIG. 3A is a side view of a vehicle 100 in a static or a steady state operating condition, according to one example. The vehicle 100 may include a head lamp unit 110a, a blindspot monitor 118a, a CHMSL 120, and a tail lamp unit 122a that are visible from this perspective. Further, a ride height A represents the appearance of the distance a bottom rear surface of the vehicle 100 is disposed above a ground plane.

Figure 3B:
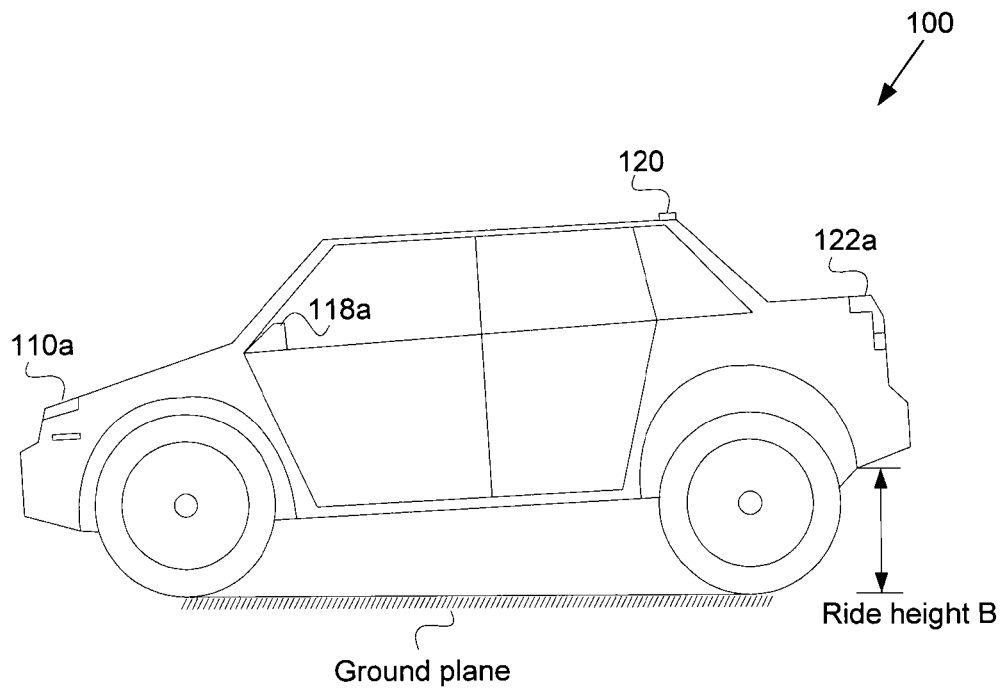
FIG. 3B is a side view of a vehicle in a pitch operating condition due to braking, according to one example.

FIG. 3B is a side view of a vehicle 100 in a pitch operating condition due to braking, according to one example. The vehicle 100 is otherwise identical to that of FIG. 3A. Further, a ride height B represents the appearance of the distance a bottom surface of the vehicle 100 is disposed above a ground plane. Ride height B is greater than ride height A due to the vehicle 100 being in a dynamic state of pitch where a first end of the vehicle 100 is lower and a second end of the vehicle 100 is elevated due to braking. The second end of the vehicle 100 is visibly higher in FIG. 3B than in FIG. 3A.

If the vehicle 100 is equipped with active or semi-active suspension capabilities, the ability to display vehicle attitude, such as a level of brake dive helpful for visually signaling to occupants of other vehicles a potential road hazard, may be helpful. Such a signal may be induced or further exaggerated by the vehicle control circuitry 150 if available surplus traction capacity is determined to also allow for safe and adequate execution of necessary avoidance maneuvers. An example brake dive signal may include at least one of the actions of lowering a front ride height and raising a rear ride height, such as by adjusting vehicle suspension components in real time.

The vehicle 100 may also indicate to the occupants of the vehicle 100 of an impending hazardous situation or an occurring emergency situation by signaling through various means such as by visual displays within the vehicle 100, emitting audible chimes or messages, and via haptic signals transmitted to components within the vehicle 100 such as a steering wheel, a shift lever, at least one seat, or other interior parts of the vehicle 100.

Additionally, the vehicle 100 may also momentarily produce a skidding sound to draw attention to an emergency maneuver by briefly locking up at least one wheel, briefly locking up at least one wheel and amplifying a sound to the exterior of the vehicle 100, or emitting such sounds via an electronic device to the exterior of the vehicle 100.

Figure 4A:
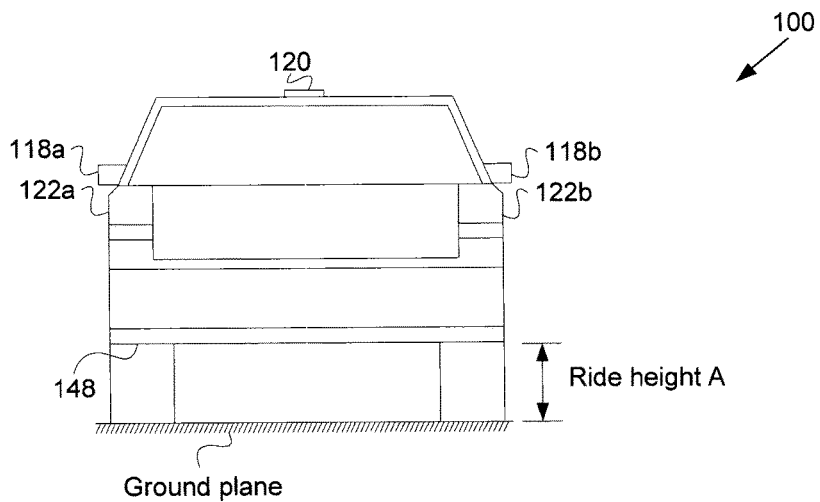
FIG. 4A is a rear view of a vehicle in a static or a steady state operating condition, according to one example.

FIG. 4A is a rear view of a vehicle 100 in a static or a steady state operating condition, according to one example. The vehicle 100 may include a CHMSL 120, a blindspot monitor 118a, a blindspot monitor 118b, a tail lamp unit 122a, and a tail lamp unit 122b that are visible from this perspective. Further, a ride height A represents the appearance of the distance a bottom rear surface of the vehicle 100 is disposed above a ground plane.

Figure 4B:
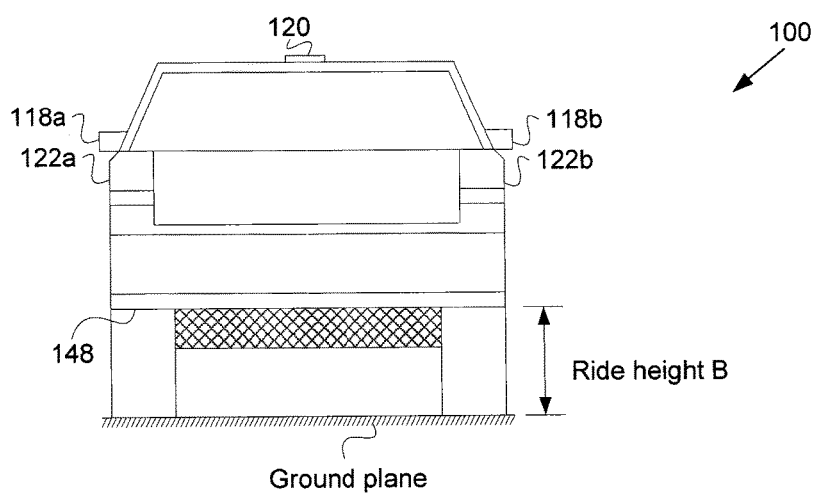
FIG. 4B is a rear view of a vehicle in a pitch operating condition due to braking, according to one example.

FIG. 4B is a rear view of a vehicle 100 in a pitch operating condition due to braking, according to one example. The vehicle 100 is otherwise identical to that of FIG. 4A, and the operating condition is the same as that described by FIG. 3B. Further, a ride height B represents the distance the bottom surface of the vehicle 100 is disposed above a ground plane. Ride height B is greater than ride height A due to the vehicle 100 being in a dynamic state of pitch where the first end of the vehicle 100 is lower and the second end of the vehicle 100 is elevated due to heavy braking. The bottom surface 148 is visibly higher in FIG. 4B than in FIG. 4A. Further, other indications of a significant change in velocity may include the rate by which the vehicle 100 slows in a horizontal direction relative to nearby objects, upward movement of the second end of the vehicle 100 such as at the bottom surface 148, revealing more area of various rear components of the vehicle 100, such as tire height and a cross hatched bottom surface visible in FIG. 4B but not in FIG. 4A.

Brake application by the brake controller 112 may mimic common responses of human drivers to emergency situations, for example abruptly applying brake pressure at the initial phase of a panic stop. Depending on initial vehicle velocity, duration of a pitch operating condition may be very brief such as during initial brake application, where the vehicle 100 experiences maximum vehicle pitch, followed by a reduction in brake force and a leveling off of vehicle pitch.

Figure 4C:
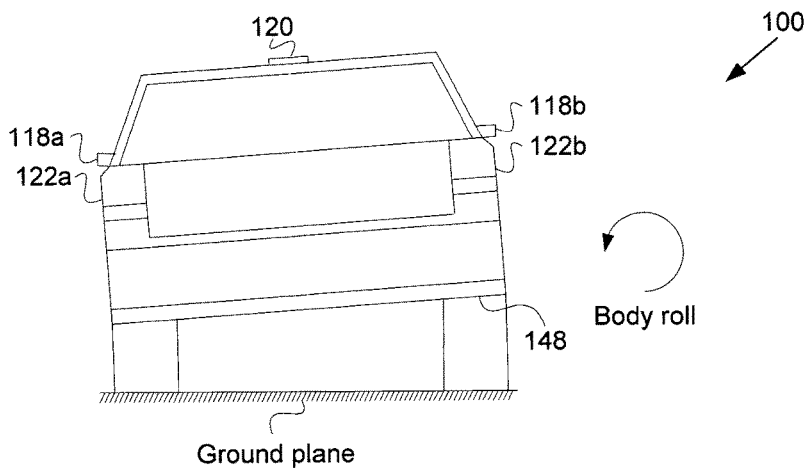
FIG. 4C is a rear view of a vehicle in a roll operating condition due to swerving, according to one example.

FIG. 4C is a rear view of a vehicle 100 in a roll operating condition due to swerving, according to one example. The vehicle 100 is identical to that of FIG. 4A and FIG. 4B. However, ride height is not even laterally from a first side of the vehicle 100 to a second side of the vehicle 100, the vehicle 100 leaning toward the first side in this example as a result of the vehicle 100 steering toward the second side. The bottom surface 148 is visibly higher on the second side of the vehicle 100 than on the first side of the vehicle 100. Further, other indications of a significant change in direction may include the rate by which the vehicle 100 transitions into the roll condition relative to nearby objects, including portions of the vehicle 100 itself such as tires and suspension. Excessive magnitudes of roll also may induce a condition of yaw for the vehicle 100. In such case the vehicle 100 may lose control by exceeding the traction limit of at least the two rear tires and "spinning out". At that point it is obvious to many occupants of other vehicles that there is a problem to be corrected, though the magnitude may be too great for the vehicle control 150 to then adequately correct.

If the vehicle 100 is equipped with active or semi-active suspension capabilities, the ability to display vehicle attitude, such as a level of body roll helpful for visually signaling to occupants of other vehicles a potential road hazard, may be helpful. Such a signal may be induced or further exaggerated by the vehicle control circuitry 150 if available surplus traction capacity is determined to also allow for safe and adequate execution of necessary avoidance maneuvers. An example body roll signal may include at least one of the actions of lowering a first side ride height and raising a second side ride height, such as by adjusting vehicle suspension components in real time. Generally such a maneuver is executed with the first side being the side the vehicle 100 steers or swerves away from, and the second side being the side the vehicle 100 steers or swerves toward.

Each vehicle condition described by FIG. 3B, FIG. 4B, and FIG. 4C may be used as a visual indicator of the vehicle 100 to signal occupants of other vehicles in the vicinity of a hazard or emergency situation. Signals may be a result solely of the vehicle 100 performing an emergency maneuver, the result solely of the vehicle 100 inducing the visual indicator to signal occupants of other vehicles, or a combination of both.

Figure 5:
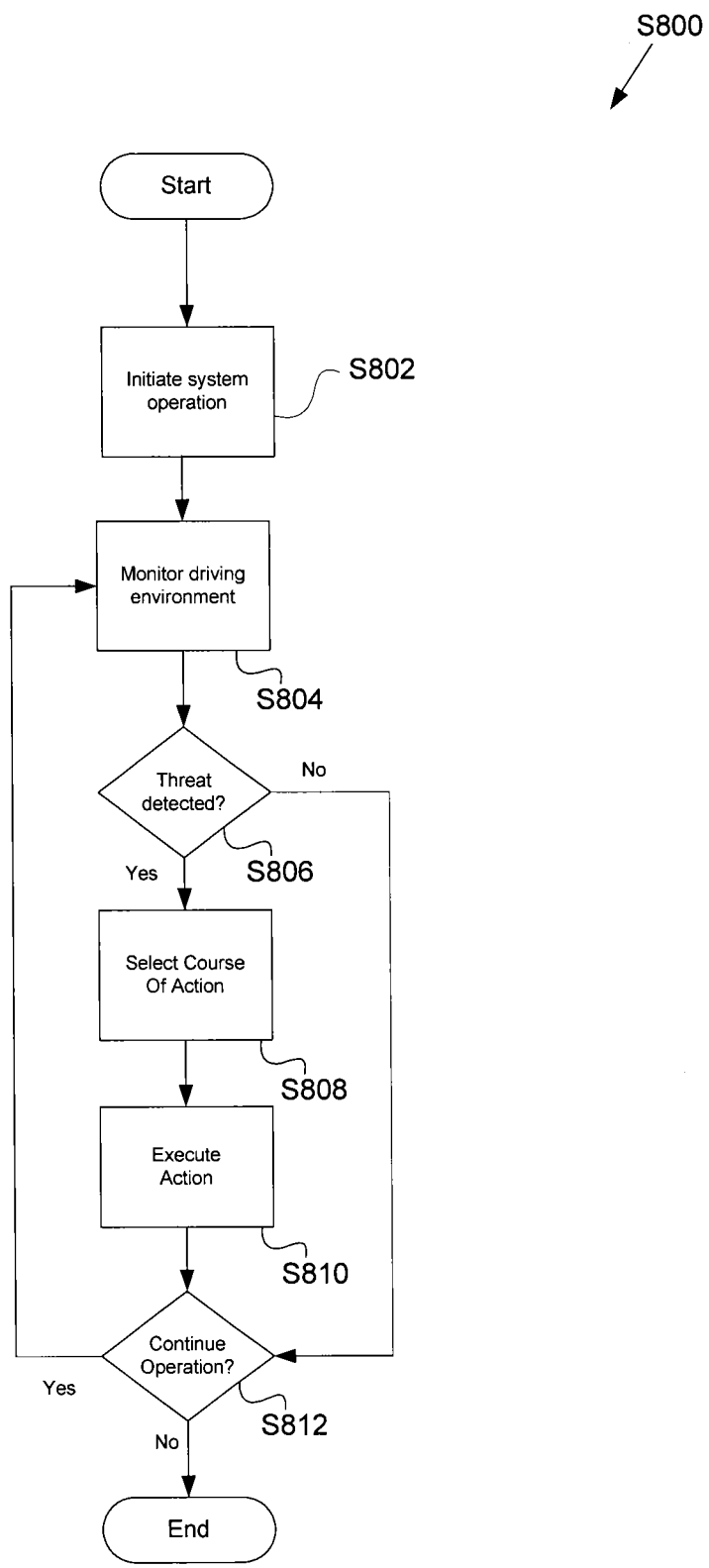
FIG. 5 is an operating diagram of a set of vehicle safety process performed by the vehicle control circuitry, according to one example.

FIG. 5 is an operating diagram of a set of vehicle safety process S800 performed by the vehicle control circuitry 150, according to one example. The S800 comprises a number of other processes. 5802 represents a process of initiating system operation performed by the vehicle control circuitry 150. Initiation of system operation may include performing systems checks, verifying the system is working, determining a location and heading of the vehicle 100, and determining conditions of a driving environment in which the vehicle 100 is operating. Upon completion of process 5802 the vehicle control circuitry 150 begins continuous execution of processes S804 and S806.

S804 represents a process of monitoring data input from a variety of sources such as sensors, calculating available collision avoidance paths (e.g., vehicle escape routes), and broadcasting the location and heading of the vehicle 100.

Sensors including at least one of the radar unit 102, the infrared unit 104, the camera unit 106, the lidar unit 108, the communication unit 116, the location unit 117, the blindspot monitor 118a, the blindspot monitor 118b, the radar unit 126, the infrared unit 128, the camera unit 130, and the lidar unit 132 allow the vehicle control circuitry 150 to collect a range of data about the driving environment. The vehicle control circuitry 150 may continually calculate and recalculate a set of potential collision avoidance paths ("escape routes") for the vehicle 100. The communication unit 116 allows the vehicle 100 to broadcast relevant safety information, such as the speed, location, heading of the vehicle 100, an emergency warning signal, as well as any unexpected change in the driving environment such as a panic stop or swerve by any observed vehicle, to nearby vehicles and electronic devices.

S806 represents a process of detecting threats. Threats are patterns the vehicle control circuitry 150 recognizes that may result in an imminent collision between the vehicle 100 and any object of significance, for example another vehicle, a large immobile object, or one or more persons. Threat detection may include determining a probable impact trajectory between the vehicle 100 and a moving object or an immobile object disposed in the intended path of travel of the vehicle 100. If at process S806 a threat is detected the vehicle control circuitry 150 proceeds to process S808. Otherwise, the vehicle control circuitry 150 continues to process S812.

S808 represents a process of the vehicle control circuitry 150 determining courses of action to execute. Actions may include steps related to performing avoidance maneuvers and signaling. One step may include selecting an alternate escape route from a set of potential escape routes determined by process S804 to which the vehicle 100 may be directed. Avoidance maneuvers may include brake application and steering, including to a degree—at least momentarily—that may exceed what is purely necessary for performance reasons, so as to signal occupants of other vehicles and other persons through a display of brake dive or body roll of the vehicle 100 that a hazardous or emergency situation may be occurring.

In other words, vehicle dynamic behavior may be exaggerated. The vehicle 100 may display more of a change in pitch, roll, or yaw than necessary to serve as an indicator or signal to other drivers and elicit a response from other drivers to respond to what may be a hazardous or impending emergency situation.

Further, aside from signaling through vehicle dynamic behavior, signaling may include broadcasting (process S804), activating lights, and providing audible signals such as by activating the horn 136.

S810 represents a process of the vehicle control circuitry 150 for executing selected actions. In process S810 the vehicle control circuitry 150 controls at least one of the head lamp unit 110a, the head lamp unit 110b, the brake controller 112, the steering controller 114, the communication unit 116, the CHMSL 120, the tail lamp unit 122a, the tail lamp unit 122b, the license plate lamp 124a, the license plate lamp 124b, and the horn 136 to perform the necessary actions selected during process S808. The selected actions may comprise performing avoidance maneuvers and signaling, operating lights, operating the horn 136, producing a vehicle pitch visible to occupants of following vehicles, producing body roll to induce a vehicle roll visible to occupants of following vehicles as well as to occupants of vehicles from other perspectives, broadcasting an emergency notification signal that may be received by infrastructure, other vehicles, and electronic devices in the vicinity of the vehicle 100 of what the specific type of threat may be (e.g. vehicle, pedestrian, other).

S812 represents a process of the vehicle control circuitry 150 determining if continued operation is needed, for example if the vehicle 100 is in operation and the vehicle control circuitry 150 is activated. The vehicle control circuitry 150 then proceeds to return to process S804. If not then the vehicle control circuitry 150 concludes operation and shuts off. One example situation where continued operation may not be needed are cases where the vehicle 100 is parked or powered down, such as when a specific transmission gear is selected or an engine ignition is turned off.

Another example where continued operation may not be needed is if the vehicle 100 has been involved in a collision and loss of control has occurred or the vehicle 100 has come to a stop. This may be detected and triggered by one or more crash sensors, chassis or body sensors (roll sensors, wheel speed sensors), or recordation by an Event Data Recorder (EDR) of a velocity change or crash pulse exceeding a threshold. At such point operation of other vehicle systems, such as that E911, eCall, or other emergency rescue contact system may be preferable.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

What is claimed is:

1. An onboard vehicle system for signaling road hazards and emergency actions to nearby road users comprising:
   at least one sensor;
   a vehicle system controller; and
   control circuitry configured to
      monitor data from the at least one sensor,
      detect a hazardous situations based on the monitored data, and
      command the vehicle system controller to control the vehicle to induce a dynamic vehicle behavior to visually signal the vehicle is performing an emergency maneuver,
      wherein the vehicle system controller is a brake controller, and the brake controller is configured to brake the vehicle to induce the vehicle to pitch to visually signal a nearby road user that the vehicle is making an emergency stop, and
      a magnitude of the vehicle pitch is greater than that necessary to avoid a frontal collision for a portion of the time the brake controller brakes the vehicle.

2. The system of claim 1 wherein:
   the brake controller is configured to lock and release a wheel producing a skidding sound.

3. The system of claim 1, further comprising:
   a steering controller configured to steer the vehicle to induce vehicle roll to visually signal the nearby road users that the vehicle is making an emergency maneuver.

4. The system of claim 3 wherein:
   the magnitude of vehicle roll induced is greater than that necessary to avoid a frontal collision for a portion of the time the steering controller steers the vehicle.

5. The system of claim 1 further comprising:
   at least one light, wherein the control circuitry is configured to turn the at least one light on and off and with at least one level of light intensity and at least one color.

6. The system of claim 5 wherein:
the at least one light includes at least one of a head lamp unit, a CHMSL, a tail lamp unit, and a license plate lamp,
wherein each light is configured to emit an illumination pattern during an emergency vehicle maneuver.

7. The system of claim 5 wherein:
the at least one light includes a tail lamp unit disposed on a side of the vehicle the vehicle is turning toward.

8. The system of claim 5 wherein:
the at least one light includes a tail lamp unit disposed on a side of the vehicle the vehicle is turning away from.

9. The system of claim 5 wherein:
the at least one light includes a first tail lamp unit and a second tail lamp unit configured to simultaneously flash during an emergency maneuver.

10. The system of claim 5 wherein:
the at least one light includes a first tail lamp unit and a second tail lamp unit configured to alternately flash during an emergency maneuver.

11. The system of claim 6 wherein:
the CHMSL includes at least one independently controllable lighting element.

12. The system of claim 1 further comprising:
a horn,
wherein the control circuitry is configured to control the horn to emit a sound.

13. The system of claim 1 further comprising:
a communication unit,
wherein the communication unit is configured to broadcast at least one of an emergency warning signal, a vehicle status, a vehicle speed, and a vehicle heading.

14. A method for alerting nearby road users of road hazards and emergency maneuvers by a vehicle, the method comprising:
   detecting, with vehicle control circuitry, potential road hazards and emergencies from at least one sensor located in the vehicle;
   calculating, with the vehicle control circuitry, collision avoidance alternatives;
   causing, with the vehicle control circuitry, the vehicle to maneuver to perform at least one of a braking and swerving action; and
   signaling, with the vehicle control circuitry and to the nearby road users, the presence of an emergency through vehicle dynamic behavior,
   wherein the braking action induces the vehicle to pitch to visually signal a nearby road user that the vehicle is making an emergency stop, and
   a magnitude of the vehicle pitch is greater than that necessary to avoid a frontal collision for a portion of the time the brake controller brakes the vehicle.

15. The method of claim 14, further comprising:
communicating, with the vehicle control circuitry, to nearby road users, using a communication unit configured to broadcast at least one of an emergency warning signal, a vehicle status, a vehicle speed, and a vehicle heading.

16. The method of claim 14, further comprising the step of:
communicating, with the vehicle control circuitry, to nearby road users, using a horn configured to be activated by the vehicle control circuitry.

* * * * *

UNITED STATES PATENT AND TRADEMARK OFFICE
CERTIFICATE OF CORRECTION

| | | |
|---|---|---|
| PATENT NO. | : 9,776,631 B1 | Page 1 of 1 |
| APPLICATION NO. | : 15/139392 | |
| DATED | : October 3, 2017 | |
| INVENTOR(S) | : Joshua E Domeyer et al. | |

It is certified that error appears in the above-identified patent and that said Letters Patent is hereby corrected as shown below:

On the Title Page

Item (73), the Assignee's information is incorrect. Item (73) should read:

--(73) Assignee: TOYOTA MOTOR ENGINEERING & MANUFACTURING NORTH AMERICA, INC., Erlanger, (KY)--

Signed and Sealed this
Twenty-fourth Day of April, 2018

Andrei Iancu
*Director of the United States Patent and Trademark Office*